G. J. PRESTES.
AUTOMOBILE JACK.
APPLICATION FILED MAR. 31, 1921.
1,403,976.
Patented Jan. 17, 1922.
2 SHEETS—SHEET 2.
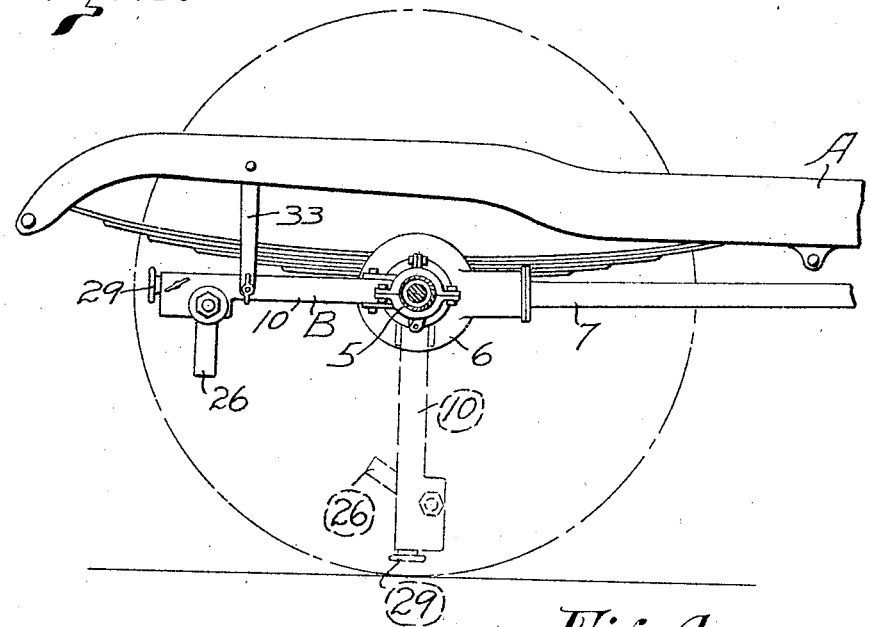
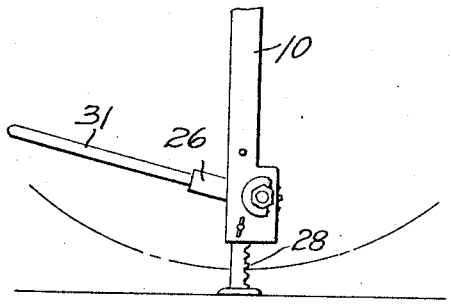
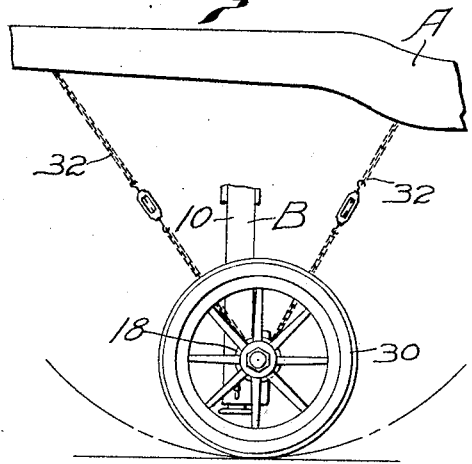
INVENTOR.
George A. Prestes
BY Westall and Wallace
ATTORNEYS.

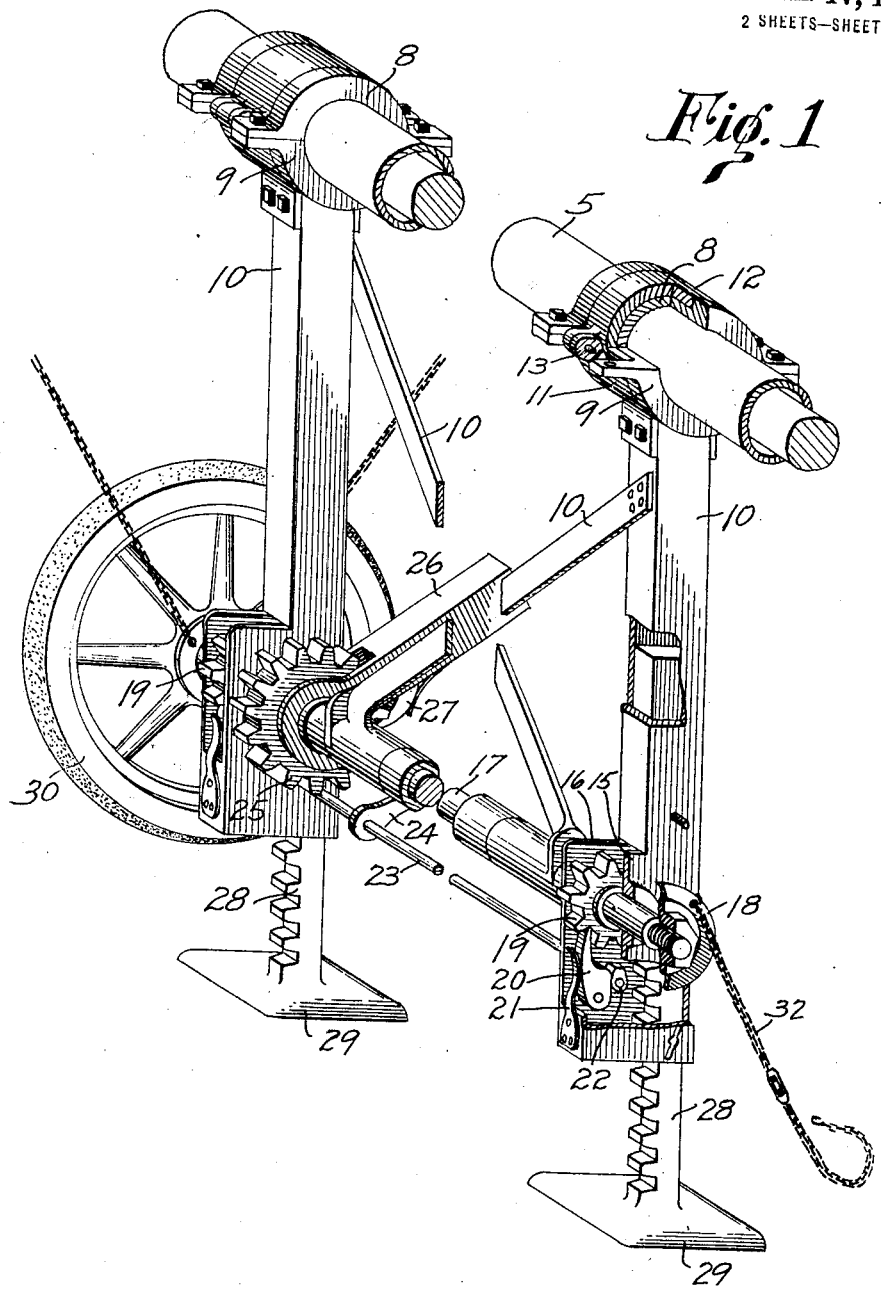

UNITED STATES PATENT OFFICE.

GEORGE J. PRESTES, OF LOS ANGELES, CALIFORNIA, ASSIGNOR OF ONE-FOURTH TO CHESTER A. NELSON, OF LOS ANGELES, CALIFORNIA.

AUTOMOBILE JACK.

1,403,976.  Specification of Letters Patent.  Patented Jan. 17, 1922.

Application filed March 31, 1921. Serial No. 457,302.

*To all whom it may concern:*

Be it known that I, GEORGE J. PRESTES, a citizen of the United States, and resident of Los Angeles, in the county of Los Angeles and State of California, have invented new and useful Improvements in an Automobile Jack, of which the following is a specification.

This invention relates to an elevating device for vehicles, and is especially adapted for use with automobiles.

The primary object of this invention is to provide an elevating device which may be attached to the axle of a vehicle in such a manner that it may be expeditiously moved into and out of operative position. It will be apparent that when the automobile is elevated, the operation of repairing, pumping and renewal of tires, washing, oiling, and testing is facilitated. The car may also be elevated to take the weight off the tires when stored for an interval and also to make starting of the engine easier. Another object of this invention is the provision of an elevating device having means to serve as a dolly in moving the car, when one or both of the wheels on an axle are inoperative, or when it is desired to remove the load therefrom in case of trouble.

These objects together with other objects and corresponding accomplishments are obtained by means of an embodiment of my invention illustrated in the accompanying drawings, in which:

Fig. 1 is a perspective view of the jack as applied to the axle of an automobile, parts being shown in section, and portions being broken out to better illustrate the construction; Fig. 2 is a view of the rear part of an automobile chassis with my improved device applied thereto, it being shown in full lines in inoperative position, and in dotted lines in operative position; Fig. 3 is a fragmentary view showing the jack in position elevating the car; and Fig. 4 is a fragmentary view showing the device in position and serving as a dolly.

Referring more particularly to the drawing, and especially to Figs. 2 and 4, A indicates the chassis of an automobile and B the jack swingably mounted upon the rear axle.

The rear axle 5 has the usual differential housing 6 to which a torque tube 7 is connected. On both sides of the differential housing are mounted journal members upon which the jack is adapted to swing. Each journal consists of two sections 8 and 9 forming a split journal which clamps upon the axle. Swingably mounted thereon are channeled guide standards 10. At the top of a standard 10 is a bearing portion 11 to which a member 12 in the nature of a strap is pivotally connected to one side by means of a hinge joint 13. The other edge thereof is adapted to be bolted to a continuation of the bearing, whereby the jack may be removed by unloosening the bolt and swinging the strap off the journal.

The standards 10 are the same in construction and it is sufficient to describe one. Adjacent to the bottom of the channel, lateral brackets 15 and 16 are formed serving as bearings for a shaft 17 extending between the standards. The shaft 17 overhangs the brackets at the standards thereby providing axles for mounting a dolly wheel thereon.

The ends of shaft 17 are threaded to receive caps. These caps serve to hold the dolly wheel in place when mounted upon the shaft. Rings 18 on the shaft used for anchoring the chains thereto. Disposed intermediate the brackets on a standard and fixed to the shaft 17 are pinions 19. These pinions also serve as ratchet wheels with which pawls 20 cooperate. The pawls are held against the pinions by means of springs 21. In order to disengage the pawl from the pinion, cams 22 are mounted upon a shaft 23 extending between the standards. Each cam has a high flat portion, so that when the shaft 23 is turned to place the cam with the flat portion resting against the pawl, the latter will be moved out of engagement with the pinion and held in the position until the shaft 23 is turned back. For convenient operation of the shaft 23, a handle 24 is attached thereto. Fixed to the shaft 17 is a ratchet wheel 25, and rotatably mounted upon the shaft 17 is an arm 26 provided with a spring pressed pawl 27 for engaging the ratchet wheel. It is obvious that by oscillating the arm 26 the shaft 17 will be intermittently moved in one direction. The pinions 19 and pawls 20 lock the shaft against reverse movement.

Slidably mounted within the channel formed in standards 10 are racks 28 in mesh with pinions 19. The racks are provided at their bottom ends with feet 29 forming pedestals. Oscillation of the handle 26 will cause the rack to be advanced or projected by reason of the motion conveyed to shaft 17 and pinions 19.

It is obvious that the strap securing a standard to the axle may be detached and the standard swung at an angle to the other standard, thereby disposing the parts so that only one of the standards operates as a jack. It is also apparent that the entire jack structure may be removed from one axle, such as the rear axle, and transferred to the other axle, such as the front axle.

An important feature of my invention resides in the construction whereby a dolly wheel 30 may be mounted upon an end of shaft 17. Suppose that an automobile has a flat tire, or the wheel has been otherwise injured. The jack is released from its inoperative position shown in full lines in Fig. 2, and swung into operative position as shown in dotted lines in Fig. 2. The car is then elevated by operating the arm 26. This may be done more conveniently by having a handle 31 fitting in the socket of the arm. However, before elevating the car the dolly wheel 30 is placed on the side of the inoperative automobile wheel. The cap is placed in position and the tie chains 32 attached to suitable hooks on the frame A of the automobile. These serve as braces for the jack and they may be tightened by means of turnbuckles or any other mechanical device. The car being elevated, the load is taken off the automobile wheel and placed upon the dolly wheel. The car can now be towed or moved under its own power any distance desired without further injuring the inoperative wheel. It is obvious that the car may be supported by two dolly wheels taking the load off of both wheels on an axle.

During ordinary and normal operation of the car, the jack is swung into horizontal position and secured in this position by any convenient means, such as a depending strap 33 secured to the automobile frame and having a detachable connection to the jack.

Whereas I have shown a specific embodiment of my invention and certain details of structure, I do not limit myself to these details, but what I claim is:

1. In combination with a wheeled vehicle, a standard detachably mounted on the axle so as to be swung about the same, a pedestal comprising a rack guided in said standard, a pinion meshing with said rack for extending said pedestal, a shaft for turning said pinion, said shaft having an axle adapted to receive a dolly wheel.

2. In combination with a wheeled vehicle, a standard detachably mounted on an axle thereof so as to be swung about the same, a pedestal comprising a rack guided in said standard, a pinion meshing with said rack for extending said pedestal, a shaft for turning said pinion, said shaft having an axle adapted to receive a dolly wheel, and a dolly wheel mounted on said axle.

3. In combination with a wheeled vehicle, a channeled standard, a pedestal comprising a rack guided in said standard, a shaft journalled in said standard and overhanging the latter to form an axle for a dolly wheel, a pinion on said shaft meshing with said rack for extending the latter, a pawl cooperating with said pinion to lock the same against retrograde movement, a ratchet and pawl mechanism for operating said shaft, and a dolly wheel mounted on said axle.

In witness that I claim the foregoing I have hereunto subscribed my name this 24th day of March, 1921.

GEORGE J. PRESTES.